April 21, 1931.  T. A. KEEN  1,801,557
ARTIFICIAL ANIMATE LURE
Filed July 14, 1927  2 Sheets-Sheet 1
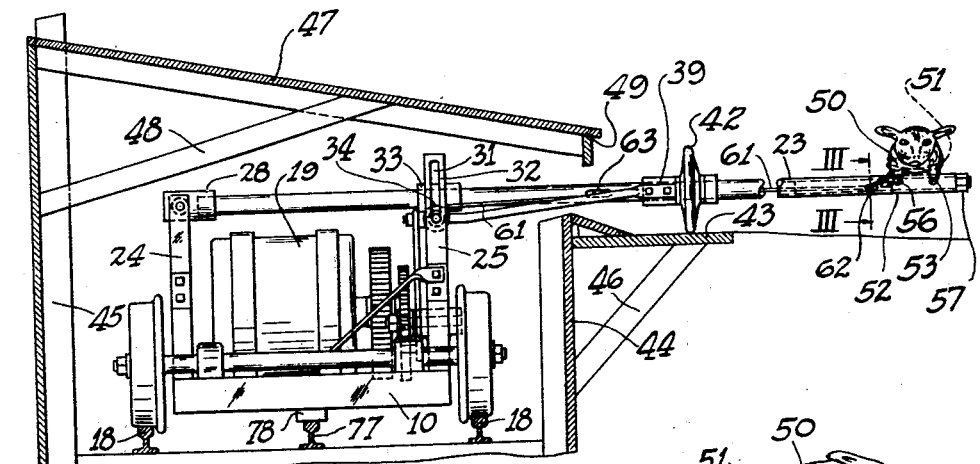
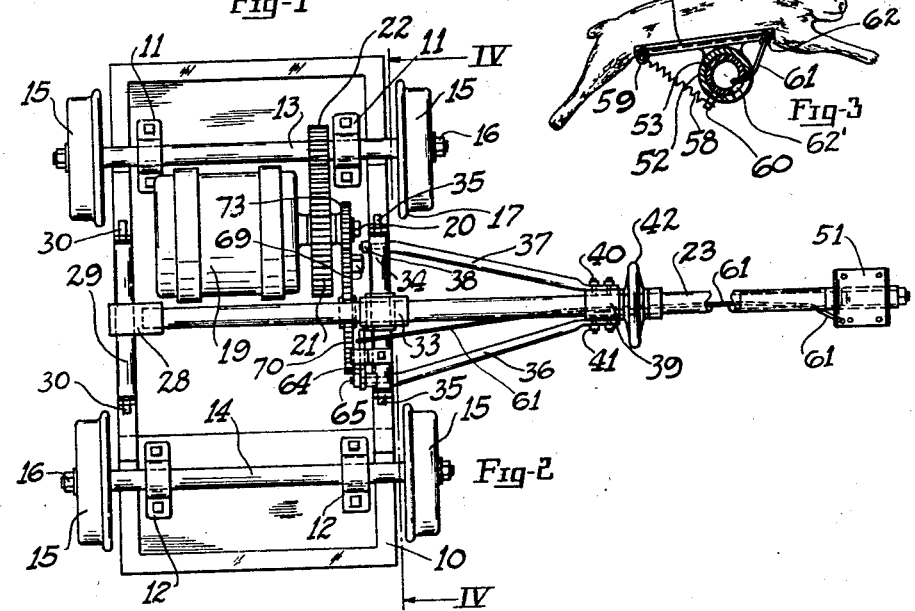
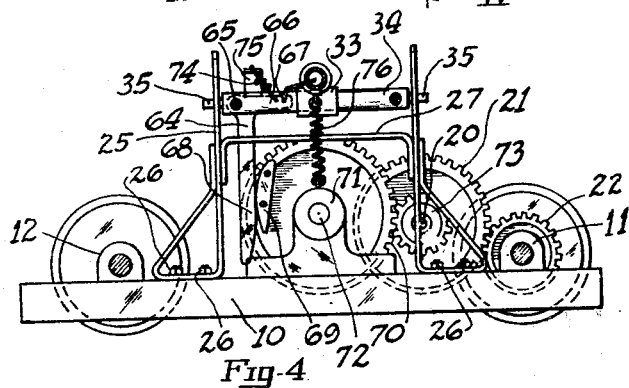
INVENTOR
THOMAS A. KEEN
By *Llwy M Hoch*
ATTORNEY April 21, 1931.   T. A. KEEN   1,801,557
ARTIFICIAL ANIMATE LURE
Filed July 14, 1927   2 Sheets-Sheet 2
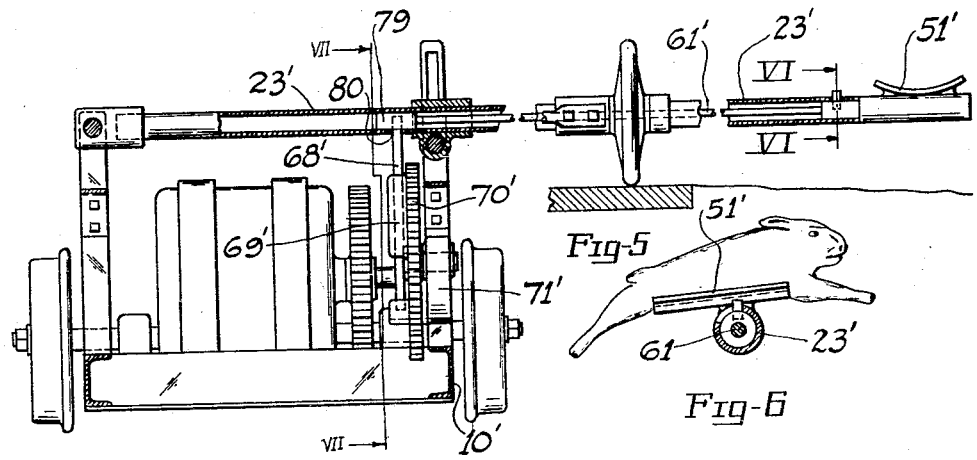
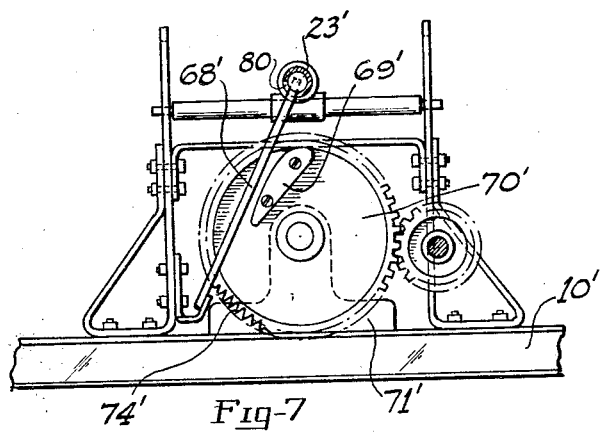
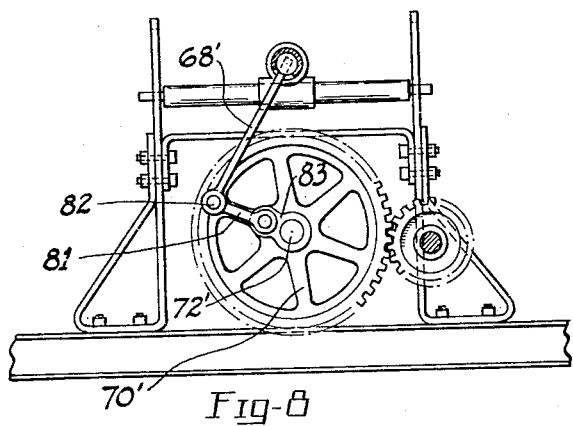
INVENTOR
THOMAS A. KEEN
BY
ATTORNEY Patented Apr. 21, 1931

1,801,557

UNITED STATES PATENT OFFICE

THOMAS A. KEEN, OF CHICAGO, ILLINOIS, ASSIGNOR TO HANNAH M. SMITH, OF CHICAGO, ILLINOIS

ARTIFICIAL ANIMATE LURE

Application filed July 14, 1927. Serial No. 205,579.

This invention relates to artificial lures and more particularly to means for effecting the animation thereof.

It contemplates more especially the provision of means for effecting movement of a mechanical lure to imitate and more closely simulate animate beings for the purpose of inducing hounds to make pursuit thereof.

Numerous devices have heretofore been proposed for inducing hounds and other animals to pursue a predetermined path defined by an artificial lure kept well in their advance to serve as an inducement in employing all possible haste to effect the capture thereof. The conscientious endeavor of the hounds to make the lure their prey results in the utmost competition which is an essential element of a race between animals having no reasoning faculties or conscious desire to win.

Known lures are not altogether satisfactory in that their inanimate posture does not always appeal to the hounds, and therefore the pursuit thereof is feeble and not always with the strongest inclination of effecting the capture thereof. For this reason, the animation of artificial lures is important or at least highly desirable in that the hounds are thereby misled into believing that the lure is natural, the result being that every effort is displayed to capture the lure prior to the other hounds competing therefor.

One object of the present invention is to simplify the construction and improve the operation of devices of the character mentioned.

Another object is the provision of means in association with a mechanical lure to effect the animation thereof.

Still another object is the provision of means for imparting movement to a lure to simulate an animal in a state of locomotion.

A further object is the provision of an artificial lure having means in association therewith to effect the conveyance thereof along a predetermined path.

A still further object is the provision of means for effecting the animation of a lure responsive to the conveyance thereof along a predetermined path.

Still a further object is to provide mechanical means interposed between a lure and its conveyor to effect intermittent movement thereof responsive to linear movement of the conveyor.

Other objects and advantages will appear from the following description of an illustrative embodiment of the present invention.

In the drawings:

Figure 1 is a view in elevation of a device embodying features of the present invention;

Figure 2 is a plan view of the device disclosed in Figure 1;

Figure 3 is a sectional view in elevation taken substantially along line III—III of Figure 1;

Figure 4 is a sectional view in elevation taken substantially along line IV—IV of Figure 2;

Figure 5 is a fragmentary sectional view in elevation of a modified embodiment of the present invention;

Figure 6 is a sectional view taken substantially along line VI—VI of Figure 5;

Figure 7 is a sectional view taken substantially along line VII—VII of Figure 5; and Figure 8 is an end sectional view in elevation of a modified embodiment of the animating means disclosed in Figure 5.

The structure selected for illustration comprises a substantially rectangular frame 10 preferably of metallic construction having aligned bearings 11 and 12 in association therewith near the ends thereof. The bearings 11 and 12 are provided with aligned bores to receive parallel disposed shafts 13 and 14, respectively, the extremities of the shafts 13 and 14 extending beyond the sides of the frame 10 to receive wheels 15. The wheels 15 are retained on the shafts 13 and 14 by means of threaded nuts 16 of standard construction. The wheels 15 are provided with peripheral flanges 17 to co-operate with parallel disposed rails 18 which serve to guide the wheeled frame or housing 10 along a predetermined path.

The housing 10 is driven relative to the rails 18 constituting traction means therefor by an electric motor 19 which is fixed for suspension from the frame 10 in any suitable manner as commercial practice may dictate. The motor 19 carries an armature shaft 20 to which a spur gear 21 is fixed to mesh with a pinion 22 carried by the shaft 13, thereby imparting rotation to the wheels 15 for guided movement over the rails 18 in frictional contact therewith to effect linear advance of the frame or housing 10.

In order to sustain a lure relative to the housing 10 so that it may be within the clear view of the hounds, an arm 23 preferably of tubular construction is supported on the frame 10 transversely thereof by means of standards 24 and 25 secured to the side members of the frame 10 by any suitable fasteners such as the studs 26. The standards 24 and 25 are each provided with a cross member 27 to rigidify the superstructure, thereby enabling it to withstand the substantial vibratory impacts to which it is subjected responsive to the movement of the frame 10 over the rails 18.

As shown, the extremity of the arm 23 is provided with a boss 28 fixed intermediate a rod 29 rotatively supported in the standard 24 by means of pins 30 axially projecting from the extremity thereof, thereby affording pivotal movement of the arm 23 within predetermined limits to be hereinafter described. The limit of pivotal movement of the arm 23 is defined by aligned slots 31 provided in confronting straps 32 constituting component elements of the standard 25. A boss 33 is fixed to the arm 23 to carry a transversely disposed rod 34 having axially projecting pins 35 which extend through the slots 31 for guided movement in a vertical direction.

To support the arm 23 as well as to reduce the vibration thereof to a minimum, convergent braces 36 and 37 are secured to the rod 34 near the extremities thereof by means of suitable fasteners 38, the other extremities thereof being fixed to a collar 39 carried by the arm 23 at a point remote from the frame 10. It is to be noted that the collar 39 has threaded studs 40 projecting therefrom to receive correspondingly threaded nuts 41 for enabling the securing of the convergent extremities of the braces 36 and 37 thereto.

To sustain the arm 23 in a substantially horizontal position, it has been found highly desirable to provide a rubber-tired wheel 42 rotatively associated therewith for frictional reaction with a raceway 43, thereby sustaining the arm 23 in the desired position during the linear movement thereof along a predetermined path defined by the traction means 18. Obviously, the wheel 42 may be dispensed with in that other expedients may be employed to sustain the arm 23 in its desired position during the locomotion of the frame 10.

It is to be noted that the housing 10 together with the instrumentalities disposed thereon, is concealed from view by means of spaced fencing 44 and 45 of unequal height, which entirely confines the rails 18 therein. The fencing 44 carries the raceway 43 by means of angle braces 46, thereby disposing it in a position to support the wheel 42 in its movement along the path defined by the rails. An inclined roof 47 is disposed over the wheeled frame positioned between the spaced fencing 44 and 45, the roof 47 being supported by the fencing 45 by means of angularly disposed braces 48 so that the lowermost edge 49 thereof terminates in spaced relation with respect to the fencing 44 to enable the arm 23 to project therethrough to carry a lure. The lure consists in this instance of a stuffed rabbit 50 fixed to the extremity of the arm 23 within full view of the hounds, who are precluded from seeing the instrumentalities employed for motivating the lure along a predetermined path.

The lure 50 is supported on an arcuate plate 51 having a tubular bearing 52 secured thereto for rotative movement relative to a tubular shaft 53 constituting an extension of the arm 23. As shown, the arm 23 has the extremity thereof shaped to define a circular projection 56 provided on the bearing 52 so as to limit the rotative movement thereof within predetermined limits, the bearing 52 being retained in position by a nut 57 in the usual manner.

The plate 51 which supports the lure 50 is normally maintained in an extreme rotative position by means of a spring 58 having one extremity 59 thereof secured to the plate 51 and the other extremity fixed to a projection 60 formed integral or otherwise with the tubular bearing 52. Movement is imparted to the lure 50 against the tension of the spring 58 by any suitable means, in this instance by a flexible tension transmitting wire 61 secured to the plate 51 as at 62 on a side opposite to the position of securing of the spring 58. The wire 61 projects through an aperture 62' provided in proximity to the extremity of the arm 23 so that it may be disposed axially therethrough for a substantial distance to conceal it from view as well as to preclude the possibility of it becoming entangled with the other instrumentalities.

The wire 61 recedes from the interior of the arm 23 near the housing 10 owing to an aperture 63 provided therein so that the wire 61 may be secured to a lever 64 or other instrumentality for effecting the actuation thereof to impart intermittent or oscillatory movement to the plate 51 which carries the lure 50. The lever 64 pivots about the standard 25 on a pin 65 so that one arm 66 thereof will receive the extremity 67 of the wire 61, the other arm 68 of the lever 64 being disposed in the path of the cam 69 fixed or otherwise secured to the lateral face of a gear 70 journalled in bearings 71. The bearings 71 are carried by the side members of the frame 10 to receive a shaft 72 which rotatively carries the gear 70 in meshing relation with a pinion 73 fixed to the extremity of the armature shaft 20. The arm 66 of the lever 64 has a spring 74 secured thereto for effecting the normal disposition of the lever arm 68 in the path of the cam 69 in that the spring 74 is fixed to a bracket 75 for creating an urge in the required direction.

The wheel 42 which is rotatively journalled on the arm 23, is maintained in frictional engagement with the raceway 43 by virtue of a coil spring 76 interposed between the bearing 71 and the boss 33 fixed to the arm 23. Obviously, it is altogether possible to dispense with this expedient, since the weight of the arm 23 is sufficient to retain the wheel in proper relation with the raceway 43.

The motor 19 is preferably energized from a third rail 77, in this instance interposed between the rails 18 to contact with an electrical conductor plate 78 establishing an electrical connection with the field of the armature through the rails 18 which carry a negative charge to complete the circuit in the usual manner.

With the arrangement of parts above described, it will be apparent that rotation of the armature shaft 20 will impart linear movement of the housing 10 over the rails 18 and simultaneously effect intermittent or oscillatory movement of the lure 50. This is effected by the rotation of the cam 69 in the path of the lever arm 68 which periodically actuates the plate 51 owing to the flexible tension transmitting wire 61 interposed therebetween. Obviously, the spring 58 will return the lure to its initial position responsive to each actuation, thereby effectively animating the lure 50 responsive to the linear movement of the housing 10 over the rails 18 which guides it along a predetermined path.

A modified embodiment of the present invention disclosed in Figure 5 comprises the provision of a rod 61' disposed axially within the tubular arm 23' so as to effect an operative connection with the plate 51' carrying the lure which is actuated by mechanism described hereinabove. The rod 61' terminates in proximity to the gear 70' journalled in the bearings 71' which are fixed to the housing 10'. A lever 68' is secured to a bearing 79 journalled within the arm 23' in fixed axial association with the extremity of the rod 61', thereby establishing a rigid connection between the lever 68' and the rod 61'.

As shown, the lever 68' projects through a slot 80 provided in the arm 23' so as to permit oscillatory movement of the lever responsive to its co-action with the cam 69' carried by the gear 70'. A spring 74' is secured to the extremity of the lever 68' to normally urge it in the path of the cam 69' in that the spring 74' is fixed to the frame 10' to normally urge the lever 68' in the direction of the cam 69'.

The rod actuating mechanism may consist, if desirable, of a positive connection between the gear 70' and the lever 68'. To this end, the extremity of the lever 68' is pivoted to a link 81 by means of a pin 82, the link 81 being pivoted to a crank arm 83 fixed to the shaft 72' carrying the gear 70'. With this arrangement, oscillatory movement is imparted to the lever 68' by virtue of a positive driving connection which will periodically actuate the lure carried by the plate 51' responsive to the movement of the wheeled frame 10' along a predetermined path defined by the traction means 18 employed in connection therewith.

It is to be noted that the plate 51 carrying the lure 50 may be loosely associated with the arm 23 for rotative movement between predetermined limits so that oscillation thereof will be effected by the frame vibrations and air forces re-acting with the lure responsive to linear movement of the frame.

Various changes may be made in the embodiment of the invention herein specifically described without departing from or sacrificing any of the advantages thereof as defined in the appended claims.

I claim:—

1. The combination with a car, of means for guiding said car along a predetermined path, a lure movably associated with said car, a prime mover for said car, and means actuated by said prime mover to impart positive intermittent periodic movement thereto responsive to movement of said driving means.

2. The combination with a car, of a lure projecting therefrom, a prime mover for imparting linear movement to said car, and means also actuated by said prime mover for effecting the animation of said lure and comprising an instrumentality for periodically actuating said lure to oscillatory movement.

3. The combination with a car, of power means on said car for effecting the movement thereof, a mechanical lure supported by said car, and means independently actuated by said power means for oscillating said lure periodically.

4. The combination with a car, traction means for guiding said car along a predetermined path, a horizontally disposed arm supported by said car, driving means carried by said car, a lure loosely associated with said arm for periodic oscillatory movement relative thereto, and means upon said driving means and connected to said lure for actuating said lure responsive to the operation of said driving means.

5. The combination with a car, of means for guiding said car along a predetermined path, a lure loosely associated with said car, driving means for said car, lure moving means on said car, and an operative connection between said driving means and said lure moving means to effect the periodic oscillatory movement of said lure.

6. The combination with a car, of means for guiding said car along a predetermined path, a lure associated with said car, and mounted to oscillate in a vertical plane parallel to the path of movement of said car, driving means for said car, a wire intermediate said lure and car, cam means on said car driven by said driving means independent of said car, and a lever pivoted in the path of said cam means and connected to said wire to periodically oscillate said lure through the medium of said wire.

7. The combination with a car, of means for guiding said car along a predetermined path, a lure associated with said car and mounted to oscillate in a vertical plane parallel to the path of movement of said car, driving means for said car, a flexible wire from said car to said lure, cam means actuated by said driving means independently of said car, a lever secured to said wire and pivoted in the path of said cam means to periodically oscillate said lure through the medium of said wire, and spring means for effecting the return of said lure subsequent to each movement thereof.

8. The combination with a wheeled frame, traction means for guiding said frame along a predetermined path, a horizontally disposed arm supported by said frame, driving means carried thereby, a lure mounted for oscillation upon said arm, and means within said arm establishing an operative connection between said lure and driving means independent of said frame driving means to effect the oscillation of said lure.

9. The combination with a wheeled frame, traction means for guiding said frame along a predetermined path, a horizontally disposed arm supported by said frame, a prime mover, gears associated with said prime mover to drive said frame, a lure mounted for oscillation upon said arm, cam means driven by said prime mover independently of said frame driving gears, and means within said arm establishing an operative connection between said lure and said driving means, to oscillate said lure responsive to the actuation of said prime mover.

10. The combination with a wheeled frame, traction means for guiding said frame along a predetermined path, a horizontally disposed arm supported by said frame, driving means carried by said frame, a plate journalled on said arm for oscillatory movement relative thereto, a lure fixed to said plate, and means to oscillate said lure comprising a cam geared to move said lure in one direction and a spring to return said lure to its normal position.

11. The combination with a wheeled frame, traction means for guiding said frame along a predetermined path, a horizontally disposed arm supported by said frame, driving means carried by said frame, a plate journalled on said arm for oscillatory movement relative thereto in a plane parallel to the plane of travel of said frame, a lure fixed to said plate, a member within said arm connected to said plate, cam means driven by said driving means, and a lever fixed to said member for disposition in the path of said cam means to impart periodic actuations to said lure.

12. The combination with a wheeled frame, traction means for guiding said frame along a predetermined path, a horizontally disposed arm supported by said frame, driving means carried by said frame, a plate journalled on said arm for oscillatory movement relative thereto in a plane parallel to the plane of travel of said frame, a lure fixed to said plate, a member within said arm connected to said plate, cam means driven by said driving means, a lever fixed to said member for disposition in the path of said cam, means to impart periodic actuations to said lure, and spring means for maintaining said lever in the path of said cam means.

13. The combination with a wheeled frame having two sides, of a laterally extending arm pivoted at one extremity thereof to one side of said frame, divergent arms vertically slidable upon the other side of said frame to support said arm intermediate the length thereof, and a lure carried at the extremity of said arm.

14. The combination with a wheeled frame having two sides, of a laterally extending arm pivoted at one extremity thereof to one side of said frame, divergent arms vertically slidable in the other side of said frame to support said arm intermediate the length thereof, a lure carried at the extremity of said arm, and a wheel journalled on said arm for contact with a raceway to sustain said lure.

15. The combination with a wheeled frame, of a laterally extending arm pivoted at one extremity thereof to one side of said frame, divergent arms vertically slidable in the other side of said frame to support said arm intermediate the length thereof, a lure carried at the extremity of said arm, a wheel journalled on said arm for contact with a raceway to sustain said lure, and spring means for maintaining said wheel on the raceway.

THOMAS A. KEEN.